May 6, 1952 J. F. O'BRIEN ET AL 2,595,285
ELECTRICAL RELAY AND SOLENOID MECHANISM
Filed Feb. 4, 1947 3 Sheets-Sheet 1

INVENTORS
JOSEPH F. O'BRIEN
JOHN B. CATALDO
BY
ATTORNEY

May 6, 1952　　　J. F. O'BRIEN ET AL　　　2,595,285
ELECTRICAL RELAY AND SOLENOID MECHANISM
Filed Feb. 4, 1947　　　　　　　　　　　　3 Sheets-Sheet 2

INVENTORS
JOSEPH F. O'BRIEN
JOHN B. CATALDO
BY
Harry J. Lucke
ATTORNEY

May 6, 1952  J. F. O'BRIEN ET AL  2,595,285
ELECTRICAL RELAY AND SOLENOID MECHANISM
Filed Feb. 4, 1947  3 Sheets-Sheet 3

INVENTORS
JOSEPH F. O'BRIEN
JOHN B. CATALDO
BY
Henry J. Lucke
ATTORNEY

Patented May 6, 1952

2,595,285

UNITED STATES PATENT OFFICE 2,595,285

ELECTRICAL RELAY AND SOLENOID MECHANISM

Joseph F. O'Brien, Lebanon, and John B. Cataldo, Annandale, N. J., assignors to John B. Pierce Foundation, New York, N. Y., a corporation of New York Application February 4, 1947, Serial No. 726,362

7 Claims. (Cl. 200—103)

This invention relates to electrical relays and to solenoid mechanisms used therein.

The electrical relay of the invention is adapted primarily for use in a low voltage control circuit for opening and closing a relatively high voltage load circuit, control being accomplished at a location or locations in the control circuit remote from the relay.

Thus, the device of the invention may be applied to advantage in domestic and industrial wiring systems in connection with utilities which it is desired to control from a number of remote points in the general area. For example, in connection with a residential lighting system the novel relay may be associated with the main 110 volt load circuit leading to a lighting fixture in such manner as to control the opening and closing of the circuit. The relay-operating circuit is of low voltage, using wire of relatively small diameter. It may extend to any desired number of control locations in the room in which the fixture is placed or in other parts of the house, the power being derived from a suitable transformer feeding low voltage current into the control circuit from the considerably higher voltage main load circuit. Because of the nature of the novel relay, low-cost push buttons may be employed in the low voltage control circuit as control instrumentalities, replacing the customary electric switches.

Previous electrical relays of this general type, notably those sold commercially under the trademark "Micromote," employ a solenoid plunger for opening and closing the load circuit contacts, and two separate solenoid coils for respectively throwing the plunger into alternate positions, together with a double-equilibrium toggle spring disc for holding the plunger in its respective thrown positions. A disadvantage is the cost factor, for, besides the double coils required in the relay proper, each control location necessitates two separate push buttons, one for "off" and one for "on."

The relay of the invention, however, employs only a single solenoid coil which acts momentarily, a single push button sufficing at each control location. Resilient means and mechanical latching means act on a novel solenoid plunger arrangement, in addition to the electrical actuations thereof, to achieve the desired opening and closing of the main load circuit.

A primary object of the invention is to provide an economical low voltage electrical relay operable to circuit-closing and circuit-opening positions at respective successive energizations thereof.

An object is to provide the above in the form of a compact unit which is positive in operation over long periods of use.

An object is to provide a single coil electrical relay necessitating only a two-wire supply system.

A further object is to provide a double-throw solenoid plunger arrangement equipped with mechanical latching.

The above and further objects and features of the invention will be fully dealt with in the following detailed description of the preferred specific embodiment illustrated, by way of example only, in the accompanying drawings.

Figure 1:
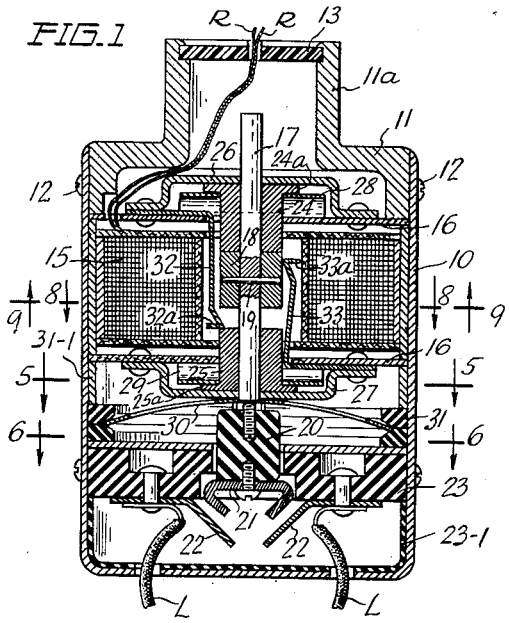
Fig. 1 is a view in vertical section taken centrally through the relay unit in its unenergized "off" position.

Referring now to the drawings:

The preferred form of the device here illustrated comprises an outer casing 10, preferably of non-magnetic material such as aluminum provided with an inset cover 11 removably secured to the casing, as for example by screws 12. The cover is formed with an open neck 11a, into which is inset a disk 13 of insulation which is perforated to afford passage therethrough of electrical lead wires, for instance the wires R, R from the low voltage control circuit illustrated in the wiring diagram of Fig. 12.

The two wires R, R lead to the windings of solenoid coil 15, and serve to electrically energize the same when the control circuit is closed. Enclosing the coil 15 is a shell of magnetic material comprising oppositely disposed pole pieces 16, 16, apertured centrally to accommodate and guide a solenoid plunger arrangement. The latter comprises a non-magnetic rod 17, to which is fixed at a location intermediate its ends a plunger element 18. A pin 19 may secure the plunger element 18 to the rod 17, as shown.

Figure 12:
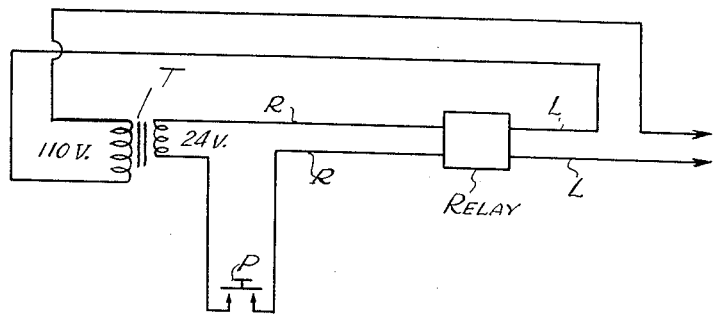
Fig. 12 is a wiring diagram of a low voltage control system utilizing the relay unit of the foregoing figures.
Figure 8:
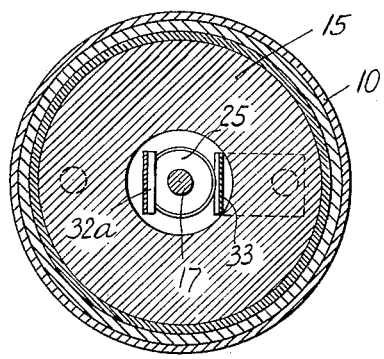
Fig. 8 is a horizontal section taken on the line 8—8, Fig. 1.
Figure 9:
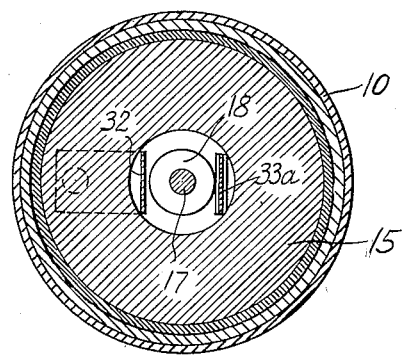
Fig. 9 is a horizontal section taken on the line 9—9, Fig. 1.
Figure 10:
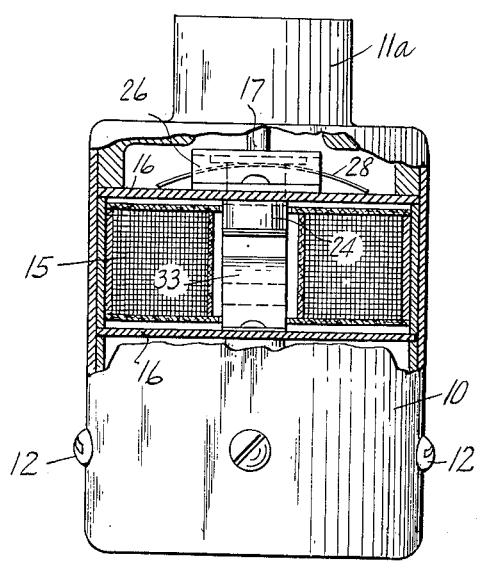
Fig. 10 is a view in side elevation of the unit with portions of the casing and coil broken out to reveal internal structure in elevation.
Figure 11:
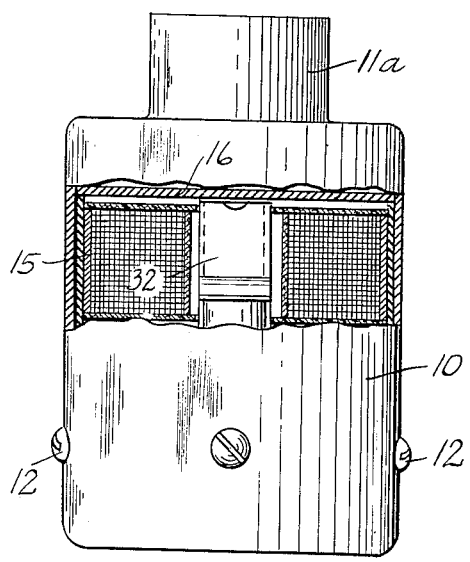
Fig. 11 is a similar view taken from the opposite side.

The work end of the plunger rod 17, that end which is directed toward the cupped portion of the casing 10, has secured thereto a block of insulation 20 carrying an electrical contact 21, such contact being adapted to make and break an electric load circuit, usually a circuit of considerably higher voltage than the control circuit, for example the 110 v. main circuit L, L, Fig. 12. To this end a pair of electrical contacts 22, 22 are secured, in mutually spaced relationship, to an insulating support 23 mounted within the casing, respective lead wires of the load circuit L, L passing through suitable apertures in the casing to connection therewith. The interior walls of casing 10 are advantageously lined with sheet insulation 23—1 in the vicinity, as shown.

Mounted on the plunger rod 17 are opposite ends of the fixed plunger 18 and within the effective field of the coil 15 are a pair of similar but oppositely disposed auxiliary plunger elements 24 and 25, these being free to slide along the plunger rod 17 under the influence of the coil 15 when the latter is energized. The entire plunger assembly acts as an armature. Such auxiliary plunger elements are normally held in outward limit positions against respective stop plates 26 and 27 by resilient means, here shown as respective sets of flat springs 28, 28 and 29, 29. The set 28 is operative between a pole piece 16 and the flanged outer end 24a of auxiliary plunger element 24, while the set 29, 29 is operative between the opposite pole piece 16 and the flanged outer end 25a of auxiliary plunger element 25.

The plunger rod 17 is held in either one or the other of two alternate thrown positions, either an "on" position where movable electrical contact 21 makes with stationary electrical contacts 22, 22, or an "off" position where the former breaks with the latter, by suitable means such as the double equilibrium toggle spring disc 30. As shown, disc 30 rests in a grooved circumferential support 31 separated from the enclosing shell of the solenoid coil 15 by means of a spacer ring 31—1.

Figure 3:
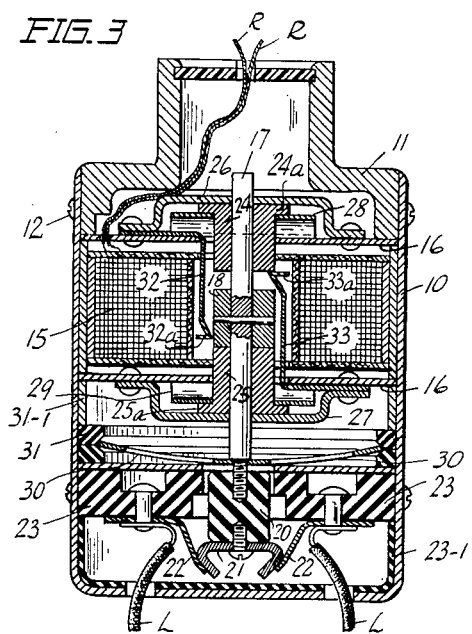
Fig. 3 is a similar view showing the unit in its unenergized "on" position.

In any unenergized thrown position of the plunger rod 17 an air gap exists between the fixed intermediate plunger element 18 and either one or the other of the freely slidable auxiliary plunger elements 24 and 25, see Figs. 1 and 3.

Mechanical latching means are provided in association with the plunger assembly, such means becoming effective —upon the creation of an air gap at either juncture—to lock the particular auxiliary plunger element concerned in its outermost position against its corresponding limit stop plate, that position in which it is normally held by the urge of its corresponding set of flat springs.

As illustrated, the mechanical latching means advantageously take the form of a pair of elongated and oppositely extending latch elements 32 and 33, respectively, of flat spring formation, whose latching tips 32a and 33a press against the solenoid plunger arrangement adjacent the respective junctures between intermediate and auxiliary plungers, and, thus, stand ready to snap into locking position in the air gaps which occur at such junctures, see Figs. 1, 3, 8 and 9. Convenient anchorage for such latch elements 32 and 33 is had at the respective pole pieces 16, 16, as shown.

The unenergized "off" position of the device is illustrated in Fig. 1. There, both auxiliary plunger elements 24 and 25 are maintained in outward limit positions by means of their respective sets of flat springs 28, 28 and 29, 29. Intermediate plunger element 18 is held in closely abutting relationship with auxiliary plunger element 24 by means of toggle spring disc 30, which is in one of its two possible positions of equilibrium. The juncture between these two plunger elements is closed, as shown, but an air gap exists between plunger elements 18 and 25. The latching tip 32a of latch element 32 presses into such air gap, holding auxiliary plunger 25 in place when the coil is energized.

Figure 2:
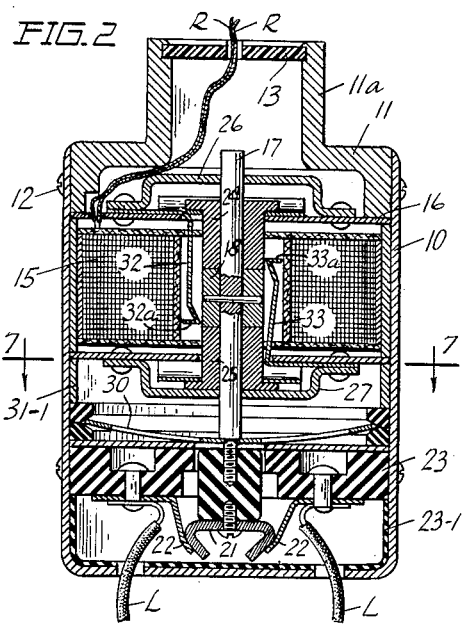
Fig. 2 is a similar view showing the unit in its energized "on" position.

Energization of the coil 15, accomplished in the circuit arrangement illustrated in Fig. 12 by pressing the push button or other momentary circuit-closing device represented at P, produces the positioning of elements as depicted in Fig. 2. Latch element 32, though holding auxiliary plunger element 25 in its outward limit position against the electrical urge tending to draw it into the solenoid, is itself pushed out of latching position when intermediate plunger element 18 and auxiliary plunger element 24, moving as a unit under the electrical urge of the solenoid, close the air gap. Plunger rod 17 is moved toward the cupped end of the casing 10, thereby closing and making the main load circuit L, L. Toggle spring 30 is thrown into its opposite position of equilibrium, so that, when the momentary energization of coil 15 ceases, plunger rod 17 is maintained in its thrown or "on" position.

The unenergized "on" position of the device is illustrated in Fig. 3, where, it is noted, auxiliary plunger element 24 has been returned to its outward limit position against stop plate 26 by means of the set of flat springs 28, 28, thus producing an air gap between it and intermediate plunger element 18. The latching tip 33a of latch element 33 has snapped into position in this gap, thereby locking auxiliary plunger 24 against inward movement by reason of the electrical urge of solenoid coil 15 upon its subsequent energization.

Figure 4:
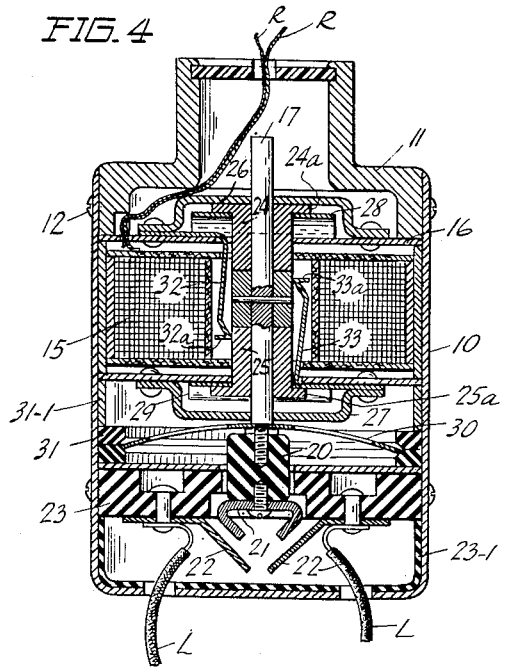
Fig. 4 is another similar view showing the unit in its energized "off" position.
Figure 5:
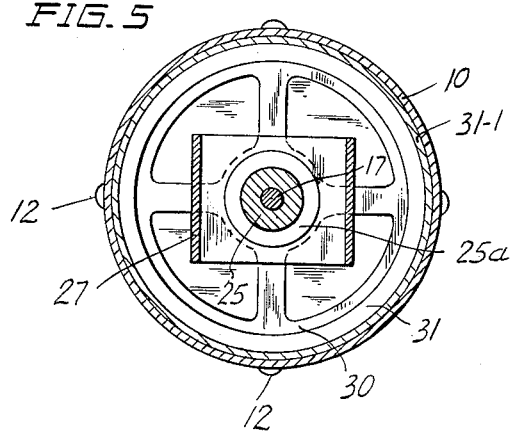
Fig. 5 is a horizontal section taken on the line 5—5, Fig. 1.
Figure 6:
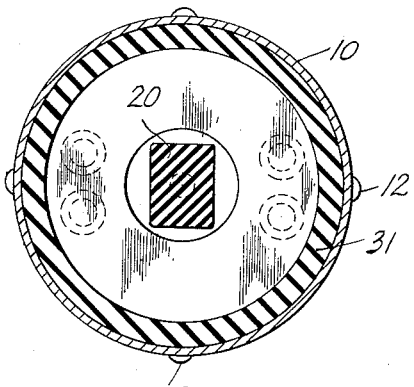
Fig. 6 is a horizontal section taken on the line 6—6, Fig. 1.
Figure 7:
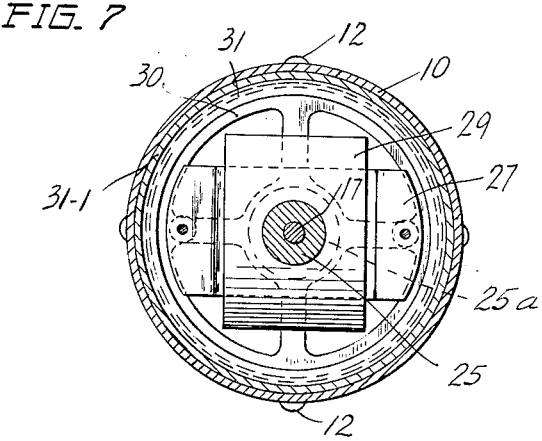
Fig. 7 is a horizontal section taken on the line 7—7, Fig. 2.

Pushing of the control button of the device P in the circuit of Fig. 12 will now place the relay unit in the energized "off" position of Fig. 4, which is just the reverse of the energized "on" position of Fig. 2. Release of the button will return the relay to the unenergized "off" position of Fig. 1, which, it should be noted, is just the reverse of the unenergized "on" position of Fig. 3.

An advantageous working voltage for the relay device is in the neighborhood of 24 volts, which, in the circuit illustrated in Fig. 12, is produced by the transformer T feeding low voltage into the control circuit R, R from the 110 v. load circuit L, L.

While the relay here illustrated is referred to as a "low voltage" relay, it is obvious that the components of the device may be engineered to handle voltage of any practical figure without substantial change in functional characteristics.

Whereas this invention is here illustrated and described with respect to a preferred specific embodiment of the invention it should be understood that various changes may be made in that embodiment and various other embodiments may be constructed on the basis of the teachings hereof by those skilled in the art without departing from the generic scope of the invention as defined by the following claims.

We claim:

1. An electrical relay comprising a single solenoid coil; a solenoid plunger rod extending through said coil; circuit make and break contact means carried by said plunger rod; an intermediate plunger element of magnetic material fixed to said plunger rod within the effective field of said coil; a pair of auxiliary plunger elements of magnetic material freely mounted on said plunger rod at respective opposite ends of said fixed plunger element, and independently slidable relative thereto, said auxiliary plunger elements also lying within the effective field of said coil; a pair of limit stops determining the respective outward limits of travel of said auxiliary plunger elements relative to said intermediate plunger element; resilient means normally acting to maintain said auxiliary plunger elements against their respective limit stops; mechanical latching means independently and alternatively operative on the respective auxiliary plunger elements to restrict movement of one or the other of said auxiliary plunger elements upon alternate cycles of energization and deenergization of said solenoid coil, said intermediate plunger being movable to unlatch said latching means during each cycle of energization and deenergization; and means for normally retaining said plunger rod in its respective thrown positions.

2. The combination recited in claim 1 wherein the mechanical latching means comprise oppositely disposed resilient latches yieldably urged against the plunger element arrangement adjacent the respective junctures of the auxiliary plunger elements for snapping into respective latching positions therebetween when afforded the opportunity.

3. The combination recited in claim 1 wherein the auxiliary plunger elements are flanged at their outer ends, and the resilient means are in the form of respective spring members operable against said flanged outer ends.

4. An electrical relay comprising a single solenoid coil; a magnetic pole piece and an outwardly spaced limit stop disposed at each end of said coil; a solenoid plunger rod extending through said coil and each pole piece for longitudinal movement when said coil is energized; an intermediate plunger element of magnetic material fixed to said plunger rod within the effective field of said coil; a pair of auxiliary plunger elements of magnetic material freely mounted on said plunger rod at the respective opposite ends of said fixed plunger element, and independently slidable relative thereto, said auxiliary plunger elements also lying within the effective field of the coil and extending through the respective pole pieces for outward movement to the respective limit stops; a pair of elongated latch elements of flat spring formation secured to the respective pole pieces and extending oppositely along said solenoid plunger arrangement within said coil to terminations yieldably urged against said plunger arrangement adjacent the respective junctures of the auxiliary plunger elements with said fixed intermediate plunger element, thereby snapping into any air gap that might exist between said fixed and said auxiliary plunger elements during an operation of the relay, said intermediate plunger being engageable with said latch elements upon a subsequent operation to release said latch elements; resilient means normally acting to maintain the auxiliary plunger elements against their respective limit stops; and means fixed to said rod for normally retaining said plunger rod in the respective extreme positions to which it is thrown by successive energizations of the coil.

5. The combination recited in claim 4 wherein the auxiliary plunger elements are flanged at their outer ends, and the resilient means are in the form of respective flat springs operable between said flanged outer ends and said pole pieces.

6. In combination, a single solenoid coil; a plunger arrangement operable by said coil, said plunger arrangement comprising an elongated plunger rod extending axially through said coil, an intermediate plunger element of magnetic material fixed to said rod, and a free plunger element of magnetic material slidably mounted upon said rod at each end of said intermediate plunger element; a stop adjacent each end of said coil for limiting the extent of outward movement of each of said free plunger elements relative to said intermediate plunger element; resilient means fixed with respect to each end of said coil normally urging each free plunger element against its adjacent stop; and a latch for each free plunger element mounted within said coil and against such free plunger element for engaging such element against actuation by said coil, said latch having a part thereof resiliently movable into the path of said intermediate plunger element adapted to be tripped thereby.

7. In combination, a single solenoid coil; a plunger extending axially through said coil, said plunger comprising an elongated plunger rod, an intermediate plunger element of magnetic material fixed to said rod, and a free plunger element of magnetic material loosely mounted upon said rod at each end of said intermediate plunger; a throw element fixed to said rod for effecting an end movement of said plunger means upon energization of said coil; mechanical latching means fixed with respect to said coil and in contact with said plunger means operative to lock certain of said plunger elements against movement and to be unlatched by said intermediate plunger element; and resilient means fixed at each end of said coil and in contact with the adjacent plunger element for positioning said element with respect to said latching means.

JOSEPH F. O'BRIEN.
JOHN B. CATALDO.

REFERENCES CITED

The following references are of record in the file of this patent:

UNITED STATES PATENTS

| Number | Name | Date |
|---|---|---|
| 1,257,613 | Kocourek | Feb. 26, 1918 |
| 1,571,401 | Erickson | Feb. 2, 1926 |
| 2,335,888 | Stilwell, Jr. | Dec. 7, 1943 |
| 2,359,048 | Monroe | Sept. 26, 1944 |
| 2,387,372 | Watkins et al. | Oct. 23, 1945 |
| 2,415,448 | Stilwell, Jr. | Feb. 11, 1947 |
| 2,417,438 | O'Brien et al. | Mar. 18, 1947 |
| 2,515,258 | O'Brien et al. | July 18, 1950 |

FOREIGN PATENTS

| Number | Country | Date |
|---|---|---|
| 403,992 | Great Britain | Dec. 27, 1933 |